(12) United States Patent
Fujimoto et al.

(10) Patent No.: US 12,736,099 B2
(45) Date of Patent: Sep. 15, 2026

(54) DISC BRAKE DEVICE FOR RAILWAY VEHICLE

(71) Applicant: NIPPON STEEL CORPORATION, Tokyo (JP)

(72) Inventors: Takahiro Fujimoto, Tokyo (JP); Yuiko Shiotani, Tokyo (JP); Hiroshi Nogami, Tokyo (JP); Ryuichi Nishimura, Tokyo (JP); Takanori Kato, Tokyo (JP); Yuki Ichikawa, Tokyo (JP); Naruo Miyabe, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 436 days.

(21) Appl. No.: 18/553,755

(22) PCT Filed: May 14, 2021

(86) PCT No.: PCT/JP2021/018500
§ 371 (c)(1),
(2) Date: Oct. 3, 2023

(87) PCT Pub. No.: WO2022/239252
PCT Pub. Date: Nov. 17, 2022

(65) Prior Publication Data

US 2024/0191762 A1 Jun. 13, 2024

(51) Int. Cl.

| | |
|---|---|
| ***F16D 65/12*** | (2006.01) |
| ***B60B 27/00*** | (2006.01) |
| *F16D 65/00* | (2006.01) |

(52) U.S. Cl.
CPC ........ *F16D 65/128* (2013.01); *B60B 27/0052* (2013.01); *F16D 65/124* (2013.01);
(Continued)

(58) Field of Classification Search
None
See application file for complete search history.

(56) References Cited

U.S. PATENT DOCUMENTS

| | | |
|---|---|---|
| 2021/0025465 A1 | 1/2021 | Kondo et al. |
| 2022/0333656 A1 | 10/2022 | Nogami et al. |

FOREIGN PATENT DOCUMENTS

| | | | |
|---|---|---|---|
| JP | 2007205428 A | 8/2007 | |
| JP | 6311551 B2 * | 4/2018 | ................ B66F 9/22 |

(Continued)

OTHER PUBLICATIONS

WO-2019194203-A1: English Machine Translation (Year: 2019).*
JP-6311551-B2: English Machine Translation (Year: 2018).*

*Primary Examiner* — Melanie Torres Williams
(74) *Attorney, Agent, or Firm* — Greer Burns & Crain Ltd.

(57) ABSTRACT

A disc brake device includes a rotary member, a brake disc, and a control member. The brake disc includes a disc body having an annular shape and fins. The control member controls an airflow rate between the fins disposed adjacent to each other in a circumferential direction of the brake disc. The control member includes a base plate and a protruding portion. The protruding portion protrudes from the base plate toward the disc body. A top surface of each fin has a recessed portion. The protruding portion extends in the circumferential direction through from the recessed portion of one of the fins disposed adjacent to each other to the recessed portion of the other of the fins.

1 Claim, 5 Drawing Sheets

(52) U.S. Cl.
CPC ... *B60B 2900/133* (2013.01); *B60B 2900/513* (2013.01); *F16D 65/0006* (2013.01)

(56) References Cited

FOREIGN PATENT DOCUMENTS

WO WO-2019194203 A1 * 10/2019 ........... F16D 65/128
WO 2021065392 A1 4/2021

* cited by examiner

Axial Direction
Radial Direction
Outer Side
Inner Side
20
21
211
212
22
221
312
24
10,13
241
32e
31
30
32
32i
222b
222s
222

DISC BRAKE DEVICE FOR RAILWAY VEHICLE

TECHNICAL FIELD

The present disclosure relates to a disc brake device for a railway vehicle.

BACKGROUND ART

A disc brake device has been widely used as a braking device for a railway vehicle. The disc brake device includes a brake disc having an annular shape and a brake lining. The brake disc is fastened to a wheel, for example, and rotate together with the wheel. The brake lining is pushed against the brake disc. The brake disc and the wheel are braked by friction between the brake lining and the brake disc.

The brake disc of a disc brake device used for a railway vehicle is required to have sufficient cooling performance from the viewpoint of ensuring durability of the brake disc. To ensure cooling performance during braking, in general, a plurality of fins are formed on the rear surface of the brake disc in a radial shape. Each fin is brought into contact with the wheel, thus forming a ventilation passage between the rear surface of the brake disc and the wheel. The ventilation passage allows air to pass therethrough from the inner side to the outer side in the radial direction of the brake disc when the brake disc rotates together with the wheel. The brake disc is cooled by the air flowing through the ventilation passage.

However, air flows through the ventilation passage formed between the brake disc and the wheel during traveling of the railway vehicle, so that aerodynamic sound is generated. Particularly, when the railway vehicle travels at a high speed, the airflow rate in the ventilation passage increases, so that a large aerodynamic sound is generated.

In view of the above, Patent Literature 1 discloses a disc brake device in which fins disposed adjacent to each other in the circumferential direction are connected with each other by connecting portions. In this disc brake device, due to the provision of the connecting portions, a portion having the minimum cross-sectional area is formed in each of ventilation passages formed between the fins. According to Patent Literature 1, by setting the sum of the minimum cross-sectional areas of the ventilation passages to 18000 $mm^2$ or less, it is possible to reduce aerodynamic sound during traveling at a high speed.

In Patent Literature 1, the connecting portions provided for reducing aerodynamic sound are integrally formed with the disc body and the fins of the brake disc. Therefore, in the brake disc, rigidity of portions in the vicinity of the connecting portions is larger than rigidity of other portions. For this reason, when a brake lining slides with respect to the brake disc during braking, thus generating frictional heat, the portions in the vicinity of the connecting portions are less likely to have heat deformation compared with other portions, so that warpage occurs in the brake disc. As a result, a load on a bolt, which fastens the brake disc to the wheel, increases.

In view of the above, Patent Literature 2 proposes a technique in which an aerodynamic sound reducing member (control member), which is a separate body from a brake disc, is provided to a disc brake device. The control member includes a support portion having a plate shape and a plurality of protruding portions that protrude from this support portion. According to Patent Literature 2, each protruding portion of the control member closes a portion of a ventilation passage, so that the flow of air through the ventilation passage is suppressed and hence, it is possible to reduce aerodynamic sound generated during traveling of the railway vehicle. Further, the brake disc and the control member are separate parts and hence, the protruding portion of the control member does not affect rigidity of the brake disc. Accordingly, it is possible to prevent a situation in which warpage occurs in the brake disc due to the protruding portion.

CITATION LIST

Patent Literature

Patent Literature 1: Japanese Patent Application Publication No. 2007-205428

Patent Literature 2: International Application Publication No. WO2019/194203

SUMMARY OF INVENTION

Technical Problem

In the disc brake device disclosed in Patent Literature 2, the control member which is a separate body from the brake disc is used so as to reduce aerodynamic sound. The control member mainly includes the support portion having a plate shape and the plurality of protruding portions. As a method for producing the control member, for example, there are a method in which the support portion having a plate shape and the plurality of protruding portions are formed as separate bodies, and these components are joined to each other by welding or the like, and a method in which a metal thin-wall material is pressed to form the support portion and the protruding portions as an integral body. However, even when either of these methods is adopted, it is necessary to take the complicated shape of the brake disc into consideration. That is, it is necessary to accurately arrange the protruding portions on the support portion in a state of preventing interference with a large number of fins provided on the rear surface of the disc body. Therefore, labor and cost necessary for processing the control member may increase.

It is an object of the present disclosure to simplify production of the control member of a disc brake device for a railway vehicle, the disc brake device including the control member that controls the airflow rate in the ventilation passage.

Solution to Problem

A disc brake device according to the present disclosure is a disc brake device for a railway vehicle. The disc brake device includes a rotary member, a brake disc, and a control member. The rotary member is to be attached to an axle of the railway vehicle. The brake disc includes a disc body having an annular shape and a plurality of fins. The disc body has a rear surface that faces the rotary member. The plurality of fins are disposed on the rear surface in a radial shape. The control member controls an airflow rate between, of the plurality of fins, fins disposed adjacent to each other in a circumferential direction of the brake disc. The control member includes a base plate and a protruding portion. The base plate is sandwiched between the rotary member and the fins. The protruding portion protrudes from the base plate toward the disc body. A top surface of each of the fins disposed adjacent to each other has a recessed portion that crosses the fin in the circumferential direction. The protruding portion extends in the circumferential direction through from the recessed portion of one of the fins disposed adjacent to each other to the recessed portion of the other of the fins.

Advantageous Effects of Invention

According to the present disclosure, it is possible to simplify the production of the control member of a disc brake device for a railway vehicle, the disc brake device including the control member that controls the airflow rate in a ventilation passage.

DESCRIPTION OF EMBODIMENT

Figure 1:
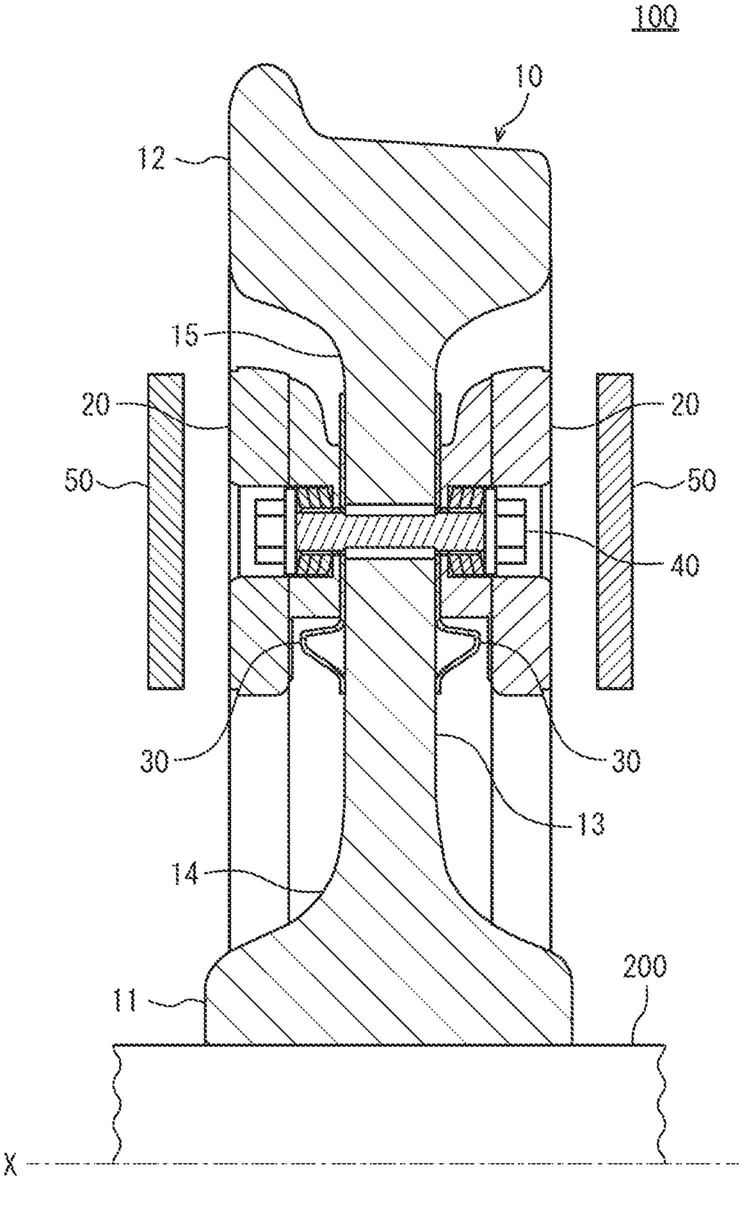
FIG. 1 is a longitudinal cross-sectional view showing a schematic configuration of a disc brake device for a railway vehicle according to a first embodiment.

A disc brake device according to an embodiment is a disc brake device for a railway vehicle. The disc brake device includes a rotary member, a brake disc, and a control member. The rotary member is to be attached to an axle of the railway vehicle. The brake disc includes a disc body having an annular shape and a plurality of fins. The disc body has a rear surface that faces the rotary member. The plurality of fins are disposed on the rear surface in a radial shape. The control member controls an airflow rate between, of the plurality of fins, fins disposed adjacent to each other in a circumferential direction of the brake disc. The control member includes a base plate and a protruding portion. The base plate is sandwiched between the rotary member and the fins. The protruding portion protrudes from the base plate toward the disc body. A top surface of each of the fins disposed adjacent to each other has a recessed portion that crosses the fin in the circumferential direction. The protruding portion extends in the circumferential direction through from the recessed portion of one of the fins disposed adjacent to each other to the recessed portion of the other of the fins (first configuration).

According to the disc brake device according to the first configuration, it is possible to control, by the control member, the airflow rate between the fins disposed adjacent to each other in the circumferential direction on the rear surface of the disc body of the brake disc. That is, in the disc brake device, the fins disposed adjacent to each other in the circumferential direction forms the ventilation passage in cooperation with the disc body and the rotary member, and the ventilation passage is partially closed by the protruding portion provided to the control member. With such a configuration, the airflow rate in the ventilation passage can be limited and hence, it is possible to reduce aerodynamic sound generated during traveling of the railway vehicle.

In the disc brake device according to the first configuration, each of the fins disposed adjacent to each other in the circumferential direction of the brake disc has the recessed portion on the top surface thereof, the recessed portion crossing the fin in the circumferential direction. The protruding portion of the control member extends in the circumferential direction through the recessed portions of the fins. That is, of the protruding portion extending in the circumferential direction, portions that correspond to the fins can be housed in the recessed portions of the fins. Therefore, in producing the control member, it is unnecessary to dispose the protruding portion in a state of avoiding the fins by taking into account the position of each fin provided on the rear surface of the disc body. Accordingly, the control member can be produced relatively simply and hence, it is possible to reduce labor and cost necessary for processing the control member.

It is preferable that the protruding portion of the control member be positioned on an inner side in a radial direction of the brake disc (second configuration).

For example, in removing foreign substances in the ventilation passage formed by the rotary member and the brake disc, air is sent into the ventilation passage from the inner side in the radial direction of the brake disc without dismantling the disc brake device. For such an operation, in the second configuration, the protruding portion of the control member is positioned on the inner side in the radial direction of the brake disc. Therefore, even when foreign substances, such as dust and mud, are clogged between the protruding portion of the control member, which partially closes the ventilation passage, and the brake disc, it is possible to easily remove the foreign substance. Accordingly, it is possible to enhance ease of maintenance of the disc brake device.

The protruding portion of the control member may be positioned on an outer side in the radial direction of the brake disc (third configuration).

Hereinafter, an embodiment of the present disclosure will be described with reference to drawings. In respective drawings, identical or corresponding components are given the same reference symbols, and the repeated description will be omitted.

First Embodiment (Overall Configuration)

FIG. 1 is a longitudinal cross-sectional view showing a schematic configuration of a disc brake device 100 for a railway vehicle according to the present embodiment. A longitudinal cross section refers to a cross section of the disc brake device 100 taken along a plane including a center axis X. The center axis X is the axial centerline of an axle 200 of the railway vehicle. Hereinafter, the direction along which the center axis X extends is referred to as "axial direction".

As shown in FIG. 1, the disc brake device 100 includes a rotary member 10, brake discs 20, and control members 30.

The rotary member 10 is to be attached to the axle 200, and rotates about the center axis X integrally with the axle 200. In the example of the present embodiment, the rotary member 10 is a wheel of a railway vehicle. However, the rotary member 10 may be a disc body other than a wheel. The rotary member 10 shown in FIG. 1 includes a boss portion 11, a rim portion 12, and a plate portion 13. The plate portion 13 connects the boss portion 11, into which an axle 200 is inserted, with the rim portion 12 forming the outer circumferential portion of a wheel. The inner circumferential edge of the plate portion 13 is coupled to the boss portion 11 via a curved portion 14 having an arc shape when the rotary member 10 is viewed in a longitudinal cross-sectional view. The outer circumferential edge of the plate portion 13 is coupled to the rim portion 12 via a curved portion 15 having an arc shape when the rotary member 10 is viewed in a longitudinal cross-sectional view.

The brake discs 20 are provided to both surfaces of the rotary member 10 having a disc shape. These brake discs 20 are fastened to the plate portion 13 of the rotary member 10 with fastening members 40 each of which is formed of a bolt and a nut, for example. A brake lining 50 is provided to the outer side of each brake disc 20 in the axial direction. The control member 30 is disposed between the rotary member 10 and each brake disc 20.

(Detailed Configuration)

Figure 2:
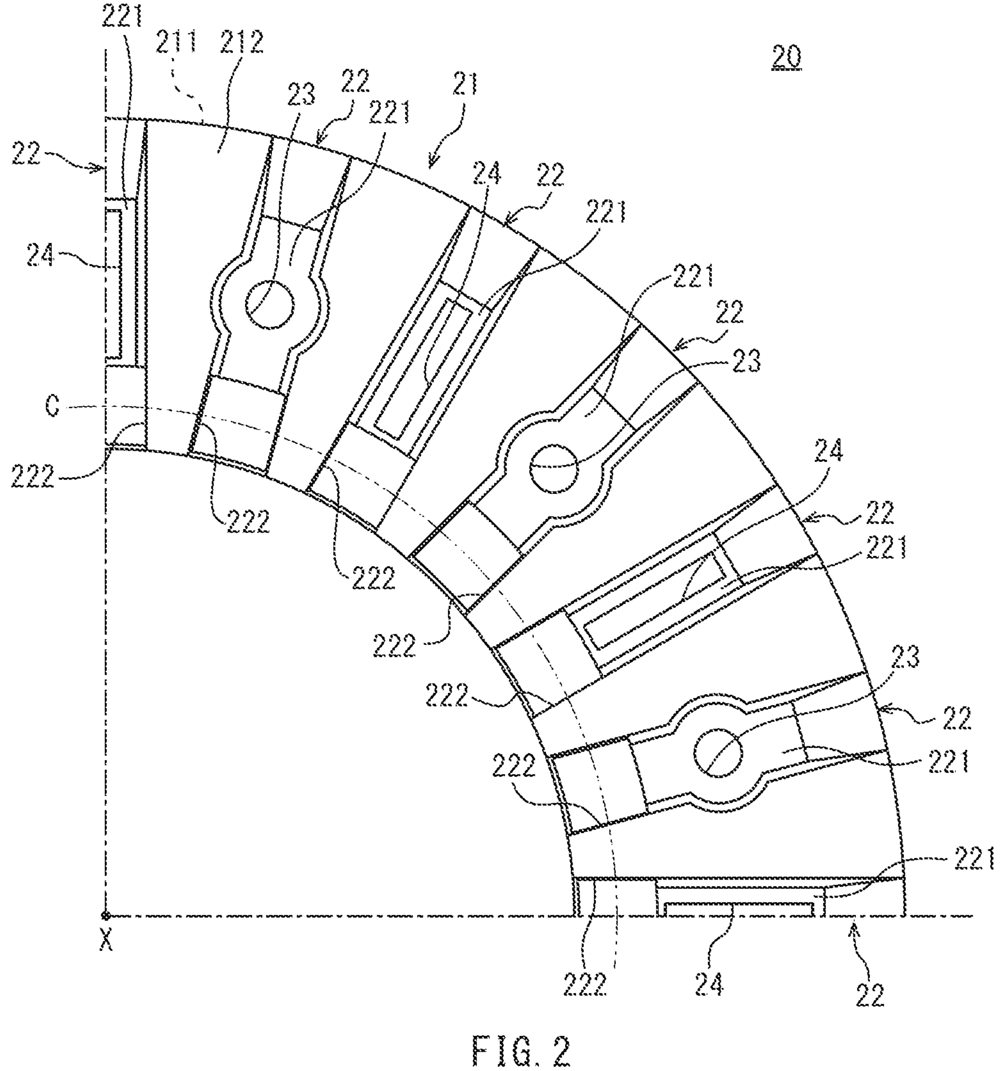
FIG. 2 is a back view of a brake disc included in the disc brake device shown in FIG. 1.

FIG. 2 is a diagram (back view) of one brake disc 20, of the brake discs 20 disposed on both surfaces of the rotary member 10, as viewed from the rotary member 10 side. FIG. 2 shows the circumferential quarter portion of the brake disc 20. Hereinafter, the circumferential direction and the radial direction of the brake disc 20 are simply referred to as the circumferential direction and the radial direction.

Referring to FIG. 2, the brake disc 20 includes a disc body 21 and a plurality of fins 22.

The disc body 21 has an annular shape. The disc body 21 substantially has an annular plate shape that uses the center axis X as the axial centerline. The disc body 21 has a sliding surface 211 and a rear surface 212. The sliding surface 211 is a surface of the disc body 21 on one side in the axial direction. The brake lining 50 (FIG. 1) is pushed against the sliding surface 211 to generate a braking force. The rear surface 212 is a surface of the disc body 21 on the other side in the axial direction, and faces the rotary member 10 (FIG. 1).

The plurality of fins 22 are disposed on the rear surface 212 of the disc body 21 in a radial shape. These fins 22 extend from the inner side to the outer side in the radial direction of the disc body 21. Each fin 22 protrudes toward the rotary member 10 (FIG. 1) from the rear surface 212. Therefore, spaces are formed between the rotary member 10, fins 22 disposed adjacent to each other in the circumferential direction, and the disc body 21. These spaces form ventilation passages through which air passes when the brake disc 20 rotates together with the rotary member 10.

In the present embodiment, some fins 22 have fastening holes 23 that penetrate through the fin 22 and the disc body 21. Key grooves 24 having a recessed shape are formed on top surfaces 221 of other fins 22. The fastening member 40 (FIG. 1) is inserted into each fastening hole 23. Keys (not shown in the drawing) that restrict relative rotation between the brake disc 20 and the rotary member 10 (FIG. 1) are fitted in the key grooves 24. The number of fins 22, the number of fastening holes 23, and the number of key grooves 24 may be suitably set. In the example of the present embodiment, the fastening hole 23 or the key groove 24 is formed in each of all fins 22. However, fins 22 having neither fastening hole 23 nor key groove 24 may be present.

The top surface 221 of each fin 22 has a recessed portion 222. Each recessed portion 222 crosses, in the circumferential direction, the fin 22 having the recessed portion 222. The recessed portions 222 are disposed on the inner side in the radial direction of the brake disc 20. These recessed portions 222 are arranged on a virtual circle C concentric with the disc body 21 when the brake disc 20 is viewed in a back view, for example.

In the example of the present embodiment, the recessed portion 222 of the fin 22 having the key groove 24 is disposed inward of the key groove 24 in the radial direction in such a way as to prevent overlapping with the key groove 24. However, provided that the key (not shown in the drawing) fitted in the key groove 24 does not interfere with the recessed portion 222, a portion of the recessed portion 222 may overlap with a portion of the key groove 24. The recessed portion 222 of the fin 22 having the fastening hole 23 is disposed inward of the fastening hole 23 in the radial direction in such a way as to prevent overlapping with the fastening hole 23.

As shown in FIG. 2, the length of the key groove 24 in the radial direction is typically greater than the diameter of the fastening hole 23. Therefore, the radial positions of the plurality of recessed portions 222 that correspond to the plurality of fins 22 are usually determined by using the key grooves 24 and the keys (not shown in the drawing) as the reference. However, in the case in which the diameter of the fastening hole 23 is greater than the length of the key groove 24 in the radial direction, the radial position of the recessed portion 222 may be determined by using the fastening hole 23 as the reference.

Figure 3:
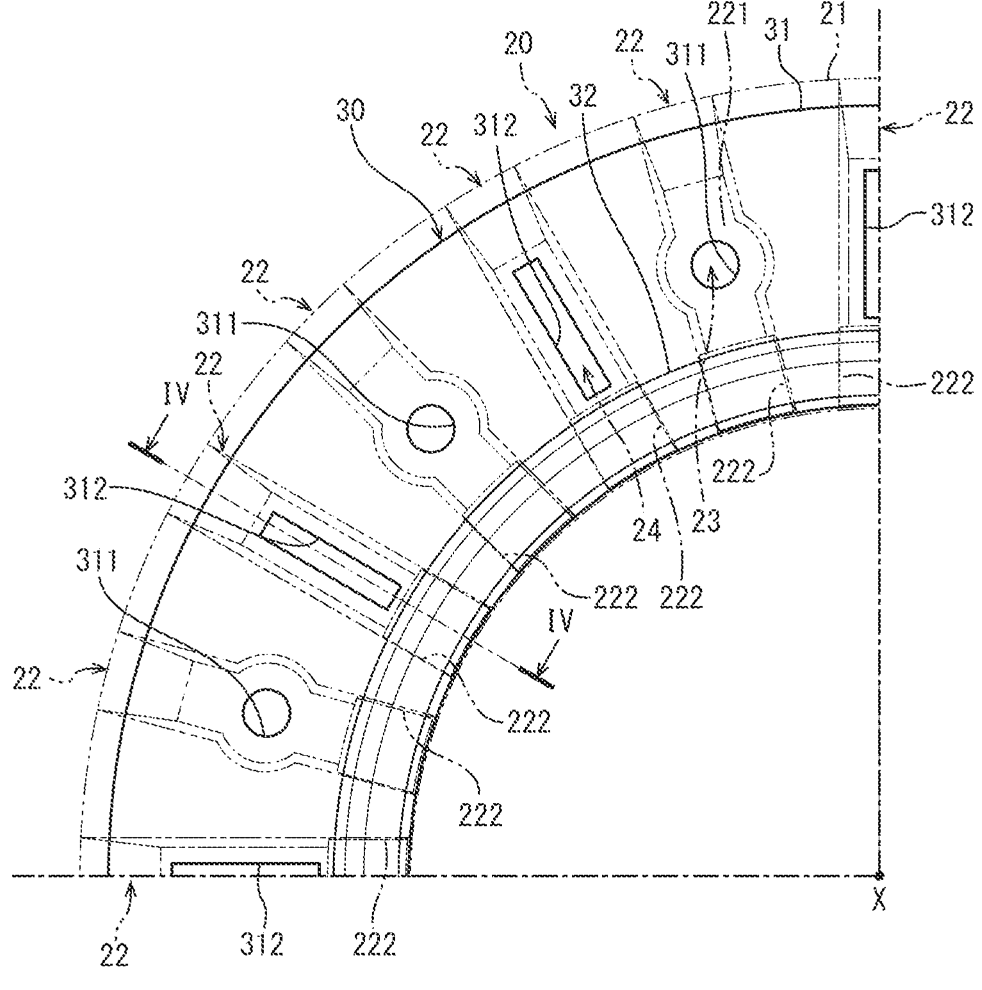
FIG. 3 is a plan view of a control member included in the disc brake device shown in FIG. 1.

FIG. 3 is a diagram (plan view) of the control member 30 as viewed from the brake disc 20 side. FIG. 3 shows the circumferential quarter portion of the control member 30. In FIG. 3, in addition to the control member 30 (solid line), the brake disc 20 is shown by two-dot chain lines.

The control member 30 is a member separated from the brake disc 20. The control member 30 controls the airflow rate between fins 22 disposed adjacent to each other in the circumferential direction. The control member 30 includes a base plate 31 and a protruding portion 32.

The base plate 31 has a substantially annular plate shape, and is disposed substantially coaxially with the disc body 21. The base plate 31 is sandwiched between the rotary member 10 (FIG. 1) and the plurality of fins 22. That is, the rotary member 10 is brought into contact with one surface of the base plate 31, and the top surfaces 221 of the fins 22 are brought into contact with the other surface of the base plate 31.

In the example of the present embodiment, the length of the base plate 31 in the radial direction is slightly shorter than the length of the disc body 21 in the radial direction. However, the length of the base plate 31 in the radial direction may be longer than the length of the disc body 21 in the radial direction, or may be equal to the length of the disc body 21 in the radial direction. The length of the base plate 31 in the radial direction may be suitably set within a range of the inner circumferential edge to the outer circumferential edge of the plate portion 13 of the rotary member 10 (FIG. 1).

To allow insertion of the fastening members 40 (FIG. 1), the base plate 31 has a plurality of openings 311 corresponding to the fastening holes 23 of the brake disc 20. Further, to allow insertion of the above-described keys (not shown in the drawing), the base plate 31 has a plurality of openings 312 corresponding to the key grooves 24 of the brake disc 20.

Of both surfaces of the base plate 31, the protruding portion 32 is formed on the surface of the base plate 31 on the brake disc 20 side. The protruding portion 32 protrudes from the base plate 31 toward the disc body 21. The protruding portion 32 is disposed at a position that corresponds to the recessed portion 222 of the fin 22 in the radial direction. In the present embodiment, the recessed portion 222 is disposed on the inner side in the radial direction of the brake disc 20 and hence, the protruding portion 32 is also positioned on the inner side of the brake disc 20. The inner side in the radial direction of the brake disc 20 refers to a region of the brake disc 20 that is inward of the axial centerline of the fastening hole 23 in the radial direction, for example. A region of the brake disc 20 that is outward of the axial centerline of the fastening hole 23 in the radial direction is the outer side in the radial direction of the brake disc 20.

The protruding portion 32 extends in the circumferential direction through from the recessed portion 222 of one of the fins 22 disposed adjacent to each other in the circumferential direction to the recessed portion 222 of the other of the fins 22. In the example of the present embodiment, the protruding portion 32 extends in the circumferential direction through the recessed portions 222 of all fins 22. That is, the protruding portion 32 has a substantially annular shape when the control member 30 is viewed in a plan view.

The control member 30 may be made of a metal thin-wall material having a sheet thickness of 1.0 mm to 3.0 mm. The control member 30 is formed by pressing this thin-wall material, for example. In this case, the base plate 31 and the protruding portion 32 are integrally formed. However, a configuration may be adopted in which the base plate 31 and the protruding portion 32 are formed as separate bodies and, thereafter, the protruding portion 32 is fixed to the base plate 31 by welding or the like.

Figure 4:
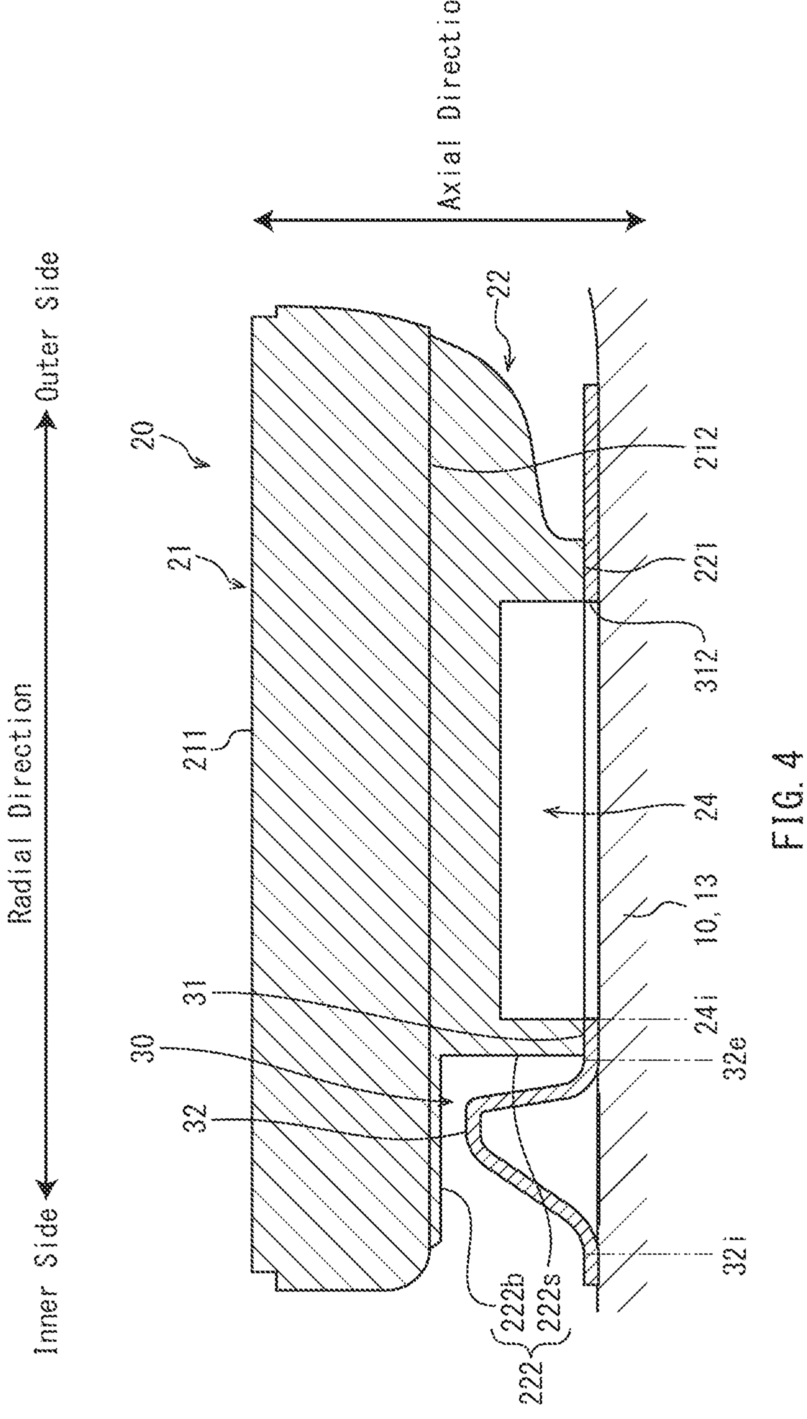
FIG. 4 is a cross-sectional view taken along the line IV-IV in FIG. 3.

Hereinafter, the relationship between the brake disc 20 and the control member 30 will be described in more detail with reference to FIG. 4. FIG. 4 is a cross-sectional view taken along the line IV-IV in FIG. 3. For the sake of convenience of description, the rotary member 10 is also shown in FIG. 4 together with the brake disc 20 and the control member 30.

Referring to FIG. 4, the recessed portions 222 of the brake disc 20 are portions that recess from the top surface 221 of the fin 22 toward the disc body 21. However, to ensure heat capacity of the disc body 21, the recessed portion 222 does not intrude into the disc body 21. That is, a bottom surface 222*b* of the recessed portion 222 is on substantially the same plane as a rear surface 212 of the disc body 21, or is located at a position closer to the top surface 221 of the fin 22 than the rear surface 212.

In the example of the present embodiment, the recessed portion 222 has a substantially L shape when the brake disc 20 is viewed in a longitudinal cross-section view. The recessed portion 222 is defined by the bottom surface 222*b* and a side surface 222*s* on the key groove 24 side.

The protruding portion 32 of the control member 30 protrudes from the base plate 31 toward the rear surface 212 of the disc body 21. Of the protruding portion 32, a portion that corresponds to the fin 22 is disposed in the recessed portion 222. The distal end of the protruding portion 32 is in contact with neither the rear surface 212 of the disc body 21 nor the bottom surface 222*b* of the recessed portion 222. That is, a gap that allows air to pass therethrough is formed between the distal end of the protruding portion 32 and the brake disc 20. A distance from the distal end of the protruding portion 32 to the rear surface 212 of the disc body 21 in the axial direction is 0.5 mm to 4.5 mm, for example.

The surface of the protruding portion 32 on the outer side in the radial direction may or may not be in contact with the side surface 222*s* of the recessed portion 222. In the case in which the protruding portion 32 is caused to be in contact with the side surface 222*s* of the recessed portion 222 in advance, it is possible to suppress deformation of the protruding portion 32 when the control member 30 rotates together with the rotary member 10 and the brake disc 20. Further, the control member 30 can be easily positioned when the control member 30 is assembled to the brake disc 20.

The shape of the protruding portion 32 may be suitably determined. The protruding portion 32 may be formed into a hollow shape, or may be formed into a solid shape. From the viewpoint of smoothly guiding air in ventilation passages, it is preferable that the surface of the protruding portion 32 have a smooth shape having no corner portion. Of the protruding portion 32, a portion located at the boundary with the base plate 31 has a substantially arc shape when the control member 30 is viewed in a longitudinal cross-sectional view, for example. An inner end 32*i* of the protruding portion 32 is a curve-end at the boundary portion with the base plate 31 on the inner side in the radial direction, and an outer end 32*e* of the protruding portion 32 is a curve-end at the boundary portion with the base plate 31 on the outer side in the radial direction.

The positions of the inner end 32*i* and the outer end 32*e* of the protruding portion 32, that is, the position and the range of the protruding portion 32 may be suitably determined. In the example of the present embodiment, the inner end 32*i* is disposed slightly outward of the inner circumferential edge of the disc body 21 in the radial direction. However, provided that the distal end of the protruding portion 32 falls within the range of the disc body 21, the inner end 32*i* may be disposed inward of the inner circumferential edge of the disc body 21 in the radial direction. The outer end 32*e* is disposed slightly inward of an inner end 24*i* of the key groove 24 in the radial direction.

Advantageous Effect

In a disc brake device 100 according to the present embodiment, the protruding portion 32 of the control member 30 protrudes toward the disc body 21 to partially close the ventilation passage defined by the rotary member 10 and the disc body 21 and the fins 22 of the brake disc 20. With such a configuration, the airflow rate in the ventilation passage can be limited and hence, it is possible to reduce aerodynamic sound generated during traveling of the railway vehicle.

In the disc brake device 100 according to the present embodiment, each fin 22 of the brake disc 20 has the recessed portion 222 on the top surface 221, the recessed portion 222 crossing the fin in the circumferential direction. The protruding portion 32 of the control member 30 extends in the circumferential direction through the recessed portions 222 of the fins 22 over the plurality of fins 22. That is, of the protruding portion 32 extending in the circumferential direction, portions that correspond to the fins 22 are housed in the recessed portions 222. Therefore, in producing the control member 30, it is unnecessary to form the protruding portion 32 in a state of avoiding the fins 22 by taking into account the position of each fin 22. Accordingly, the control member 30 can be simply produced and hence, it is possible to reduce labor and cost necessary for processing the control member 30.

In the present embodiment, the protruding portion 32 of the control member 30 is positioned on the inner side in the radial direction of the brake disc 20. Therefore, by sending air into the ventilation passage from the inner side in the radial direction of the brake disc 20, it is possible to relatively easily remove foreign substances clogged between the protruding portion 32 and the brake disc 20. Accordingly, it is possible to enhance ease of maintenance of the disc brake device 100.

Second Embodiment

Figure 5:
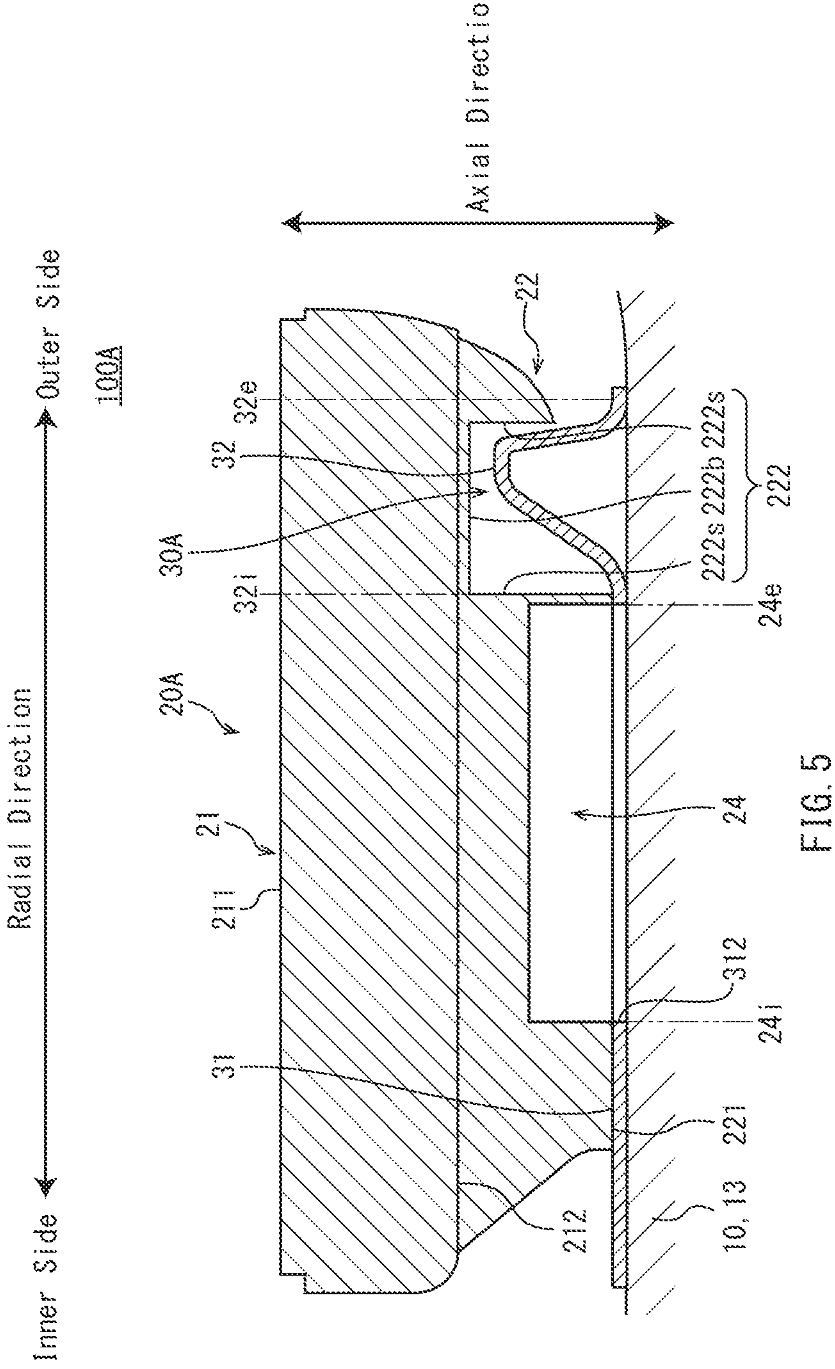
FIG. 5 is a longitudinal cross-sectional view showing a portion of a disc brake device for a railway vehicle according to a second embodiment.

FIG. 5 is a longitudinal cross-sectional view showing a portion of a disc brake device 100A according to a second embodiment. The disc brake device 100A according to the present embodiment basically has the same configuration as the disc brake device 100 according to the first embodiment. However, the disc brake device 100A differs from the disc brake device 100 in the position of the protruding portion 32 of a control member 30A.

As shown in FIG. 5, the protruding portion 32 of the control member 30A is positioned on the outer side in the radial direction of a brake disc 20A. Corresponding to such a configuration, the recessed portion 222 provided to each fin 22 of the brake disc 20A is also positioned on the outer side in the radial direction of the brake disc 20A.

In the example of the present embodiment, the recessed portion 222 has a substantially rectangular shape when the brake disc 20A is viewed in a longitudinal cross-sectional view. That is, the recessed portion 222 is defined by a bottom surface 222*b* and side surfaces 222*s* disposed on both sides of the bottom surface 222*b*.

In the same manner as the first embodiment, the protruding portion 32 of the control member 30A protrudes from the base plate 31 toward the rear surface 212 of the disc body 21. The recessed portions 222 house portions of the protruding portion 32 that corresponds to the fins 22. Neither the rear surface 212 of the disc body 21 nor the bottom surface 222*b* of the recessed portion 222 is in contact with the protruding portion 32. However, the protruding portion 32 may be in contact with at least one of both side surfaces 222*s* of the recessed portion 222. In the case in which the protruding portion 32 is caused to be in contact with one of or both side surfaces 222*s* of the recessed portion 222, deformation of the protruding portion 32 during rotation is suppressed. Further, the control member 30A can be easily positioned with respect to the brake disc 20A.

In the present embodiment, an inner end 32*i* of the protruding portion 32 is disposed slightly outward of an outer end 24*e* of the key groove 24 in the radial direction. An outer end 32*e* of the protruding portion 32 is disposed inward of the outer circumferential edge of the disc body 21 in the radial direction.

Also in the disc brake device 100A according to the present embodiment, the protruding portion 32 of the control member 30A partially closes the ventilation passage defined by the rotary member 10 and the fins 22 and the disc body 21 of the brake disc 20A. With such a configuration, the airflow rate in the ventilation passage can be limited and hence, it is possible to reduce aerodynamic sound generated during traveling of the railway vehicle.

In the same manner as the first embodiment, the protruding portion 32 of the control member 30A can extend in the circumferential direction through the recessed portions 222 of the fins 22 over the plurality of fins 22. Therefore, in producing the control member 30A, it is unnecessary to form the protruding portion 32 in a state of avoiding the fins 22 by taking into account the position of each fin 22. Accordingly, the control member 30A can be simply produced and hence, it is possible to reduce labor and cost necessary for processing the control member 30A.

The embodiment according to the present disclosure has been described heretofore. However, the present disclosure is not limited to the above-mentioned embodiments, and various modifications are conceivable without departing from the gist of the present disclosure.

In the above-mentioned first embodiment, the protruding portion 32 of the control member 30 is positioned on the inner side in the radial direction of the brake disc 20. In the above-mentioned second embodiment, the protruding portion 32 of the control member 30A is positioned on the outer side in the radial direction of the brake disc 20A. However, the position of the protruding portion 32 is not limited to the examples shown in these embodiments. For example, the protruding portion 32 may be suitably moved in the radial direction within a range of the inner circumferential edge to the outer circumferential edge of the plate portion 13 of the rotary member 10. That is, the inner end 32*i* and the outer end 32*e* of the protruding portion 32 may be disposed at any positions within a range of the inner circumferential edge to the outer circumferential edge of the plate portion 13. However, the protruding portion 32 is disposed in a state of preventing interference with the key and the fastening member 40.

In the above-mentioned embodiment, the recessed portion 222 provided to the fin 22 has an L shape or a rectangular shape when the brake disc 20, 20A is viewed in a longitudinal cross-sectional view. However, the shape of the recessed portion 222 is not limited to the above. The recessed portion 222 may have a shape that extends along the protruding portion 32 of the control member 30, 30A.

In the above-mentioned embodiment, the base plate 31 and the protruding portion 32 of the control member 30, 30A have a substantially annular shape as viewed in a plan view. However, the control member 30, 30A may be divided into a plurality of parts in the circumferential direction. The control member 30, 30A may be divided into two parts, or may be divided into four parts in the circumferential direction, for example.

REFERENCE SIGNS LIST

- 100, 100A: disc brake device
- 10: rotary member
- 20, 20A: brake disc
- 21: disc body
- 212: rear surface
- 22: fin
- 221: top surface
- 222: recessed portion
- 30, 30A: control member
- 31: base plate
- 32: protruding portion

The invention claimed is:

1. A disc brake device for a railway vehicle, the disc brake device comprising:

a rotary member to be attached to an axle of the railway vehicle;

a brake disc including a disc body having an annular shape and a plurality of fins, the disc body having a rear surface that faces the rotary member, the plurality of fins being disposed on the rear surface in a radial shape; and a control member configured to control an airflow rate between, of the plurality of fins, fins disposed adjacent to each other in a circumferential direction of the brake disc, the control member including a base plate sandwiched between the rotary member and the plurality of fins and a protruding portion protruding from the base plate toward the disc body, wherein a top surface of each of the fins disposed adjacent to each other has a recessed portion that crosses the fin in the circumferential direction, the protruding portion extends in the circumferential direction through from the recessed portion of one of the fins disposed adjacent to each other to the recessed portion of the other of the fins, the protruding portion is positioned on an inner side in a radial direction of the brake disc, and the recessed portion is open to the radially inner side of the brake disc.

* * * * *